United States Patent
Kreifeldt

(10) Patent No.: US 10,474,716 B2
(45) Date of Patent: Nov. 12, 2019

(54) CLUSTERING OF MUSICAL CONTENT FOR PLAYLIST CREATION

(71) Applicant: Harman International Industries, Incorporated, Stamford, CT (US)

(72) Inventor: Richard Allen Kreifeldt, South Jordan, UT (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 919 days.

(21) Appl. No.: 14/589,826

(22) Filed: Jan. 5, 2015

(65) Prior Publication Data

US 2016/0196345 A1 Jul. 7, 2016

(51) Int. Cl.
| | | |
|---|---|---|
| G06F 17/30 | (2006.01) | |
| H04L 29/06 | (2006.01) | |
| G06F 16/68 | (2019.01) | |
| G06F 16/28 | (2019.01) | |
| G06F 16/638 | (2019.01) | |
| G10H 1/00 | (2006.01) | |
| G06F 16/635 | (2019.01) | |
| G10L 15/00 | (2013.01) | |
| G10L 15/22 | (2006.01) | |

(52) U.S. Cl.
CPC .......... *G06F 16/686* (2019.01); *G06F 16/287* (2019.01); *G06F 16/637* (2019.01); *G06F 16/639* (2019.01); *G10H 1/0008* (2013.01); *H04L 65/60* (2013.01); *G10H 2240/081* (2013.01); *G10H 2240/105* (2013.01); *G10H 2240/131* (2013.01); *G10L 15/00* (2013.01); *G10L 2015/223* (2013.01)

(58) Field of Classification Search
USPC ........................................................ 707/738
See application file for complete search history.

(56) References Cited

U.S. PATENT DOCUMENTS

| | | | |
|---|---|---|---|
| 2002/0091736 A1* | 7/2002 | Wall ...................... | G06F 16/958 |
| | | | 715/234 |
| 2005/0038819 A1* | 2/2005 | Hicken ................. | G11B 27/105 |
| 2008/0091717 A1* | 4/2008 | Garbow ................ | G06F 16/635 |
| 2008/0195654 A1* | 8/2008 | Weare ................... | G06F 16/683 |

(Continued)

OTHER PUBLICATIONS

Extended European Search Report Application No. 15200122.8, dated May 18, 2016, 14 pages.

(Continued)

*Primary Examiner* — Kuen S Lu
(74) *Attorney, Agent, or Firm* — Artegis Law Group, LLP

(57) ABSTRACT

One embodiment provides a non-transitory medium containing computer program code that performs an operation that includes determining an initial musical preferences model describing acoustical characteristics of musical content by identifying user preferences. Additionally, the operation includes dividing the initial musical preferences model into a plurality of cluster models based on the identified user preferences, each of the plurality of cluster models representing a respective set of acoustical characteristics of musical content. One of the plurality of cluster models is selected. The operation further includes creating a playlist by selecting instances of available musical content for playback using the selected cluster model.

18 Claims, 8 Drawing Sheets

(56) References Cited

U.S. PATENT DOCUMENTS

| | | |
|---|---|---|
| 2009/0069912 A1 | 3/2009 | Stefik |
| 2010/0030772 A1* | 2/2010 | Zilca ................... G06F 16/337 |
| | | 705/319 |
| 2010/0169493 A1 | 7/2010 | Yamakawa et al. |
| 2010/0205222 A1 | 8/2010 | Gajdos et al. |
| 2010/0312547 A1 | 12/2010 | Van et al. |
| 2011/0035031 A1* | 2/2011 | Faenger ................ G06Q 30/00 |
| | | 700/94 |
| 2012/0166436 A1 | 6/2012 | Kalasapur et al. |
| 2013/0080371 A1* | 3/2013 | Harber ................. G06F 16/686 |
| | | 706/50 |
| 2013/0339018 A1* | 12/2013 | Scheffer ................ G10L 17/22 |
| | | 704/236 |
| 2014/0195544 A1* | 7/2014 | Whitman .............. G06F 16/435 |
| | | 707/744 |
| 2014/0229498 A1* | 8/2014 | Dillon ................ G06Q 30/0282 |
| | | 707/767 |
| 2015/0106727 A1* | 4/2015 | Boulter ............... G06F 16/9574 |
| | | 715/739 |
| 2016/0197967 A1* | 7/2016 | Kreifeldt ............ G06K 9/00255 |

OTHER PUBLICATIONS

Ja-Hwung Su et al: "Music Recommendation Using Content and Context Information", IEEE Intelligent Systems, IEEE, US, vol. 25, No. 1, Jan. 2010 (Jan. 2010), pp. 16-26, XP011305125, ISSN: 1541-1672 * p. 17-p. 20 and p. 23.

* cited by examiner

CLUSTER MODEL      300

```
GENRE              =    ROCK
ERA                =    1988 - 1999
TEMPO              =    75 - 140
LOUDNESS           =    44 - 68
AGGRESIVENESS      =    4 - 8
MELODIC            =    61 - 90
SPOKENNESS         =    0 - 7
VOCAL - TO - INSTRUMENTAL    =    0.7 - 1.4
```
— 310

```
GENRE              =    HIP HOP
ERA                =    1981 - 1995
TEMPO              =    95 - 135
LOUDNESS           =    35 - 64
AGGRESIVENESS      =    5 - 8
MELODIC            =    14 - 40
SPOKENNESS         =    40 - 94
VOCAL - TO - INSTRUMENTAL    =    2.0 - 5.0
```
— 320

FIG. 3

CLUSTERING OF MUSICAL CONTENT FOR PLAYLIST CREATION

BACKGROUND

Field of the Invention

The present disclosure relates to infotainment systems, and more particularly, to generating a combined playlist tailored to the musical preferences of a user based on clusters of musical preferences.

Description of the Related Art

Today interconnected devices are more common than ever before and the popularity of such devices is continuing to increase at a rapid pace. For instance, it is not uncommon for a person to have a mobile device (e.g., a smart phone), a television, a tablet computing device, a media player and a vehicle navigation system. As more and more devices are built with the capability and logic to communicate with other devices, new possibilities are unlocked for providing a completely integrated experience for a user.

Traditionally, for the playback of musical content, users have had the option of manually creating their own personalized playlist (e.g., dynamically by selecting various songs for playback, in advance by creating a list of songs for playback on a computerized device, etc.) or listening to generalized playlists on radio stations that are not personalized for the user in question. As technology has evolved, infotainment devices and techniques have been created that are capable of producing a playlist that is personalized for a particular user. However, while conventional playlist creation techniques can better approximate a particular user's likes and dislikes with respect to musical content, such techniques at best model a user's general musical tastes and do not account for the user's specific circumstances.

SUMMARY

One embodiment provides computer-readable medium having computer code embodied thereon that is configured to, when executed, perform an operation. The operation includes determining an initial musical preferences model describing acoustical characteristics of musical content by identifying user preferences. The operation further includes dividing the initial musical preferences model into a plurality of cluster models based on the identified user preferences. Each of the plurality of cluster models represents a respective set of acoustical characteristics of musical content. One of the plurality of cluster models is selected for use in creating a playlist and the playlist is then created by selecting instances of available musical content for playback using the selected cluster model.

Another embodiment provides a system that includes one or more computer processors and a memory storing computer program code that, when executed by operation of the one or more computer processors, performs an operation. The operation includes determining an initial musical preferences model describing acoustical characteristics of musical content by identifying user preferences. The operation further includes dividing the initial musical preferences model into a plurality of cluster models based on the identified user preferences. Each of the plurality of cluster models represents a respective set of acoustical characteristics of musical content. One of the plurality of cluster models is selected for use in creating a playlist and the playlist is then created by selecting instances of available musical content for playback using the selected cluster model.

Yet another embodiment provides a method that includes determining an initial musical preferences model describing acoustical characteristics of musical content by identifying user preferences. The method further includes dividing the initial musical preferences model into a plurality of cluster models based on the identified user preferences. Each of the plurality of cluster models represents a respective set of acoustical characteristics of musical content. Additionally, the method includes selecting one of the plurality of cluster models and creating a playlist using the selected cluster model by selecting instances of available musical content for playback.

BRIEF DESCRIPTION OF THE SEVERAL VIEWS OF THE DRAWINGS

FIG. 3 illustrates a cluster model describing a temporal window of musical preferences for a user, according to one embodiment described herein.

DETAILED DESCRIPTION

Figure 1:
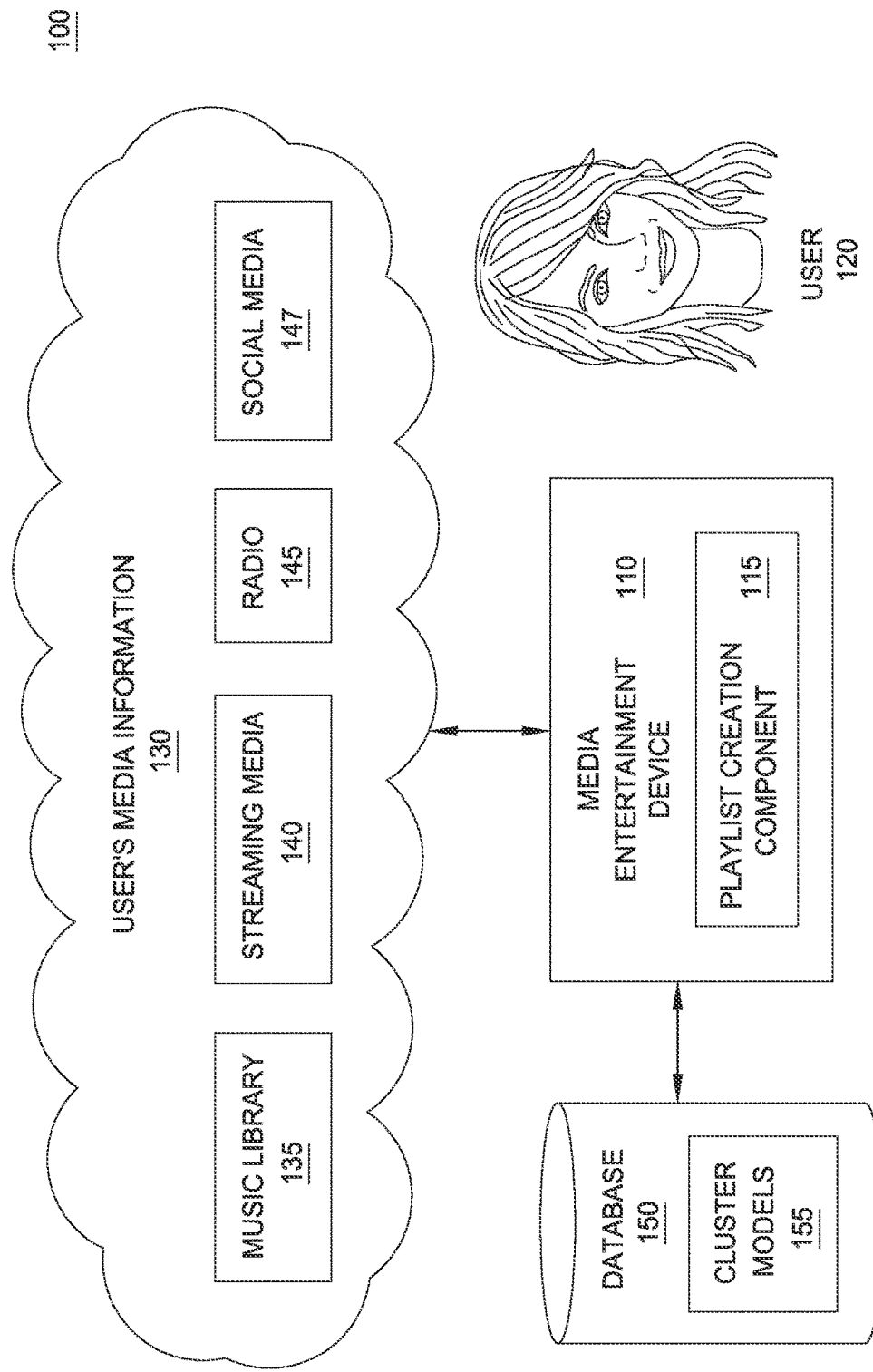
FIG. 1 is a diagram illustrating a system configured with a playlist creation component, according to one embodiment described herein.

While conventional techniques may tailor a playlist around an individual's general musical preferences, such techniques are unable to account for an individual's preferences as to groupings of musical content. For instance, while a user may generally enjoy selections from both the classical music genre and the hip hop music genre, the user may not wish to hear these genres together on a particular playlist. Rather, the user may prefer to listen to classical music under certain circumstances and may enjoy listening to rock music under different circumstances. On the other hand, the user may further enjoy hip hop music as a general matter, and while the user may sometimes enjoy hip hop music interspersed with rock selections on a playlist, the user may not enjoy for hip hop to be included with classical music selections. As such, a musical recommendation system that models only for the user's general musical preferences may fail to account for the user's preferences as to temporal groupings of musical content (i.e., musical content the user enjoys being grouped together for playback within a window of time).

Additionally, the process of music discovery has become increasingly reliant on broadcast radio, yet the selection of content played by broadcast radio stations has gradually been reduced as broadcast radio stations become increasingly risk adverse with respect to musical selections outside of the mainstream. As such, at a time when the vast majority of people are reliant on broadcast radio to discover new artists and musical selections, the diversity of content played by broadcast radio stations is decreasing. Accordingly, it is becoming increasingly difficult for individuals to discover new musical content outside of the mainstream. Nonetheless, music discovery is still an important process, as introducing users to new content enriches the users' experience and, from a commercial perspective, increases the universe of musical content that the users are likely to purchase.

As such, embodiments provide techniques for generating a playlist tailored to the individual preferences of the user, using a musical preference model containing multiple cluster sub-models. For instance, embodiments may determine an initial musical preferences model describing acoustical characteristics of musical content by identifying preferences of a user. For example, embodiments could access a user profile for the user to retrieve a current musical preferences model that describes the respective user's musical preferences. Such a preference model could specify acoustical characteristics that the respective user has an affinity towards (e.g., expressed as a single value, as a range, etc.) and could further specify a preference strength value for each of the acoustical characteristics indicating a respective strength of the affinity.

Generally, such a model could be generated based on the user's previous interactions with the media player and/or other media players and services. For example, logic on the media player could generate an initial model for the user based on the user's locally available media content (e.g., musical selections available for playback from local storage within the vehicle), metadata describing the user's previous interactions with the locally available media content (e.g., which songs a user listens to most, artists the user listens to, genres of music the user listens to, how often the user listens to particular songs, etc.). Additionally, the media player could take into account other preferences information which the media player has access to (e.g., based on a privacy policy specified in the user profile). Examples of such other information include, without limitation, radio stations the user listens to on the media player as well as other media devices (e.g., online streaming radio stations), musical content the user owns and/or listens to on other media players (e.g., a library of musical content the user maintains in remote cloud storage), social network interactions (e.g., interactions between the user and artists on a social networking site), and so on in generating the model. More generally, it is broadly contemplated that embodiments can take into account any available information that can be indicative of the user's musical preferences.

The media player could divide the initial musical preferences model into a plurality of cluster models, each describing a respective set of acoustical characteristics of musical content for a respective temporal window of preferences of the user. That is, while the initial musical preference model describes the entire set of musical content the user enjoys, generally each of the cluster models describes the user's musical preferences at a given time, which typically includes a subset of the acoustical characteristics specified in the initial musical preferences model. For example, the media player could monitor the user's listening behavior over time and could determine that the user has a general preference for music from the genres of rock, hip hop, blues and soul. Based on the observed user behavior, the media player could divide the general preference model for the user into cluster and could determine that the user has a first cluster of musical content that includes rock and hip hop musical selections having certain acoustical characteristics that the user enjoys listening to together, and a second cluster of blues and soul music with other acoustical characteristics that the user also enjoys listening to. In other words, while the user enjoys both rock and soul music, the particular user in question may not enjoy listening to selections from these genres on the same playlist (i.e., within a temporal listening window), and the media player could represent these preferences using two cluster sub-models.

The media player could then select one of the plurality of cluster models and could create a playlist for the user by selecting instances of available musical content for playback using the selected cluster model. For instance, the media player could identify a library of available musical content for the user and can use the selected cluster model to create a playlist of two or more musical selections from the library of available musical content. For example, the media player could determine that a network connection (e.g., an Internet connection) exists over which musical content can be streamed, and thus the media player could determine that the library of available musical content includes both locally available media content and streamable media content (e.g., from one or more streaming sources available to at least one of the users in the immediate physical environment). As another example, upon determining that no network connection is available, the media player could determine a collection of locally available musical content. For example, in an embodiment where the media player resides within a user's vehicle, the media player could identify all musical content on the media player's local storage devices as well as musical content available for playback from the users' mobile devices (e.g., over a wireless connection such as Bluetooth®).

Once the library of available musical content is identified, the media player can select particular instances of musical content from the library for inclusion in the playlist, based on the selected cluster model. Generally, the media player can select instances of musical content having acoustical properties that match the acoustical characteristics specified in the selected cluster model. Of note, while the selected instances of musical content may generally match the user's musical preferences as specified in the selected cluster model, certain instances of musical content may still be new to the user. For example, where the user has a preference for a particular sub-genre of jazz music in a given cluster, a particular song matching the sub-genre could be selected from the available content even though the user has never heard the selection before, thereby facilitating the discovery of new music for the user.

In addition to selecting instances directly matching the preferences model, the media player can be configured to also include related musical selections from the user's individual preferences model. For example, upon determining that the user has an affinity towards several different sub-genres of jazz music, the media player could include a selection from a different sub-genre of jazz, based on the user's individual preferences model. Doing so provides an improved music discovery process, as the user may be more likely to enjoy undiscovered musical content that is acoustically similar to musical content the user enjoys. The media player could also select discoverable music (e.g., music available for remote streaming but not currently purchased by any of the users) that is determined to match the musical preferences described by the cluster preferences model for inclusion on the playlist. For example, the media player could employ a machine algorithm to select selections of discoverable music that are acoustically similar to the preferences described in the cluster preferences model. Doing so allows the user to discover new music that the user is likely to enjoy and that matches the user's current listening preferences.

In selecting discovery content for the users, the media player can take into account additional user information such as a measure of how adventurous a particular user has historically been with respect to musical content. For instance, the media player could determine that a particular user has historically been very adventurous when trying new, undiscovered musical content, and thus the media player could tend to select more discovery content for the particular user. On the other hand, the media player could determine that another user has historically been very conservative with respect to discovering new musical content and predominately listens to substantially the same set of musical selections.

In addition to selecting musical content for inclusion on the playlist, the media player can dynamically generate a log of the playlist that includes all relevant metadata describing the selections of musical content (e.g., artist name, album name, genre, sub-genre, etc.). In creating such a log, the media player could create an individualized log for each of the users, emphasizing music that the particular user has not yet purchased and/or does not have rights to listen to (e.g., via a subscription service). Such a log could further include links through which the user can purchase the musical content. Generally, the log can take any number of different forms, with examples including (without limitation) email messages, screens of a native application (e.g., on a user's mobile device), screens of a web application, and so on. Doing so exposes the user to new music and facilitates the purchase of new music by the user, thereby providing an improved music discovery process.

FIG. 1 is a diagram illustrating a system configured with a playlist creation component, according to one embodiment described herein. As shown, the system 100 includes a media entertainment device 110 that is capable of discovering the user's 120 user media information 130. As shown, the media entertainment device 110 is configured with a playlist creation component 115. As discussed above, the playlist creation component 115 can generally be configured to create a playlist tailored to the musical preferences of the user 120, based on a selection of a cluster sub-model within a user preferences model for the user 120.

In accessing the user's media information 130, the playlist creation component 115 may perform an authentication operation for the user 120. For example, in an embodiment where the media player device 110 is configured to operate within the cabin of a vehicle, the playlist creation component 115 could identify the user 120 as present within the vehicle's cabin. For example, the playlist creation component 115 could capture one or more images of the vehicle's cabin using I/O devices such as a camera sensor(s). The playlist creation component 115 could then perform a facial recognition algorithm to identify one or more faces within the captured images and could match the recognized faces with predefined user facial data corresponding to recognized users of the vehicle. That is, the user 120 could have created a user profile that includes a previously capture image(s) of the user, and the playlist creation component 115 could match the images captured within the vehicle's cabin to the predefined images within the user profiles in order to identify the user 120. As another example, the playlist creation component 115 could collect biometric data (e.g., weight, average heart rate, etc.) from users within the vehicle (e.g., using I/O devices such as biometric sensors located within each seat of the vehicle) and could identify the users by matching the monitored biometric data to predefined biometric data corresponding to recognized users of the vehicle. As yet another example, the playlist creation component 115 could identify the user based on login and password information. More generally, any suitable technique for identifying the user 120 can be used, consistent with the functionality described herein.

As shown, the media entertainment device 110 can access a database 150 that stores cluster models 155 for the user 120. The playlist creation component 115 can generate or otherwise obtain the cluster models 155, based on the user's respective media content and history. Generally, such a model describes acoustical characteristics of musical content the particular user has an affinity for and that the user enjoys listening to within a temporal window. For example, the model could specify that the user has an affinity for Rock music and could specify a number of metadata values (or ranges) that describe acoustical characteristics of the type of Rock music the particular user enjoys. Examples of such metadata could include, without limitation, tempo, loudness, aggressiveness, accousticalness, a ratio of vocals to instrumentals, musical key(s), and so on. For example, the model could specify that a particular user enjoys Rock music in a particular range of aggressiveness, having loudness in another range, and so on. Of course, such examples are provided for illustrative purposes only, and more generally, any acoustical characteristic capable of being represented within a model can be used, consistent with the present disclosure.

In creating the model for the user, the playlist creation component 115 could discover the user media information 130 that includes the user's media library 135, instances of streaming media 140 the user has listened to, radio stations 145 (e.g., broadcast radio, streaming radio, etc.) the user has listened to and social media interactions 147 of the user (e.g., musical artists the user has indicated an affinity for on social media sites). In addition, the playlist creation component 115 can discover metadata describing the user's 120 past interactions with particular musical content. For example, such metadata could specify how many times the user listened to a particular instance of musical content in the music library 135, user feedback provided for a particular instance of musical content (e.g., selected a "like" option for the content, selected a "did not like" option, listed the content as a "favorite," etc.), whether the user changed to a different radio station or otherwise stopped playback of the current radio station during a particular song, and so on.

In one embodiment, the media entertainment device 110 is configured with a network adapter in order to facilitate communications over a communications network (e.g., the Internet). In such an embodiment, the playlist creation component 115 could transmit identification information for the user 120 to a remote server (e.g., a service deployed within a cloud computing environment) which maintains the preference models for the user 120. The remove server could then return the individual preference models for the identified user 120 to the playlist creation component 115, for use in creating a playlist for the user 120. Such an embodiment that includes a centralized server may be preferable, for instance, where the users wish their preference models to be available on multiple different media entertainment devices

110. Moreover, maintaining a single, centralized preference model based on a user's listening patterns and feedback across multiple media entertainment devices may improve the accuracy of the preference model, relative to maintaining separate preference models on each of the individual media entertainment devices, as all of the user's information can be consolidated in the centralized preference model as opposed to spread out across multiple separate models.

Additionally, the playlist creation component 115 (or, e.g., another instance of the playlist creation component 115 executing on the remote server) can maintain a plurality of different groups of users, where each group corresponds to a grouping of users who share common musical interests. In determining the individual preferences of a particular user, the playlist creation component 115 could classify the user into one of the groups of users and could estimate the particular user's preferences based on the preferences of the group of users. For instance, the playlist creation component 115 could classify the user based on metadata describing the user (e.g., the user's age, geographic location, etc.), the user's known musical preferences (e.g., the user has already shown a strong interest in a particular genre of music, a particular artist, etc.) and so on. Doing so allows the playlist creation component 115 to quickly and accurately estimate the user's preferences. Subsequently, the playlist creation component 115 can continue to refine the group preference model as well as the user's classification. For example, the playlist creation component 115 could incorporate the user's particular preferences back into the group's preference model to refine the model and can potentially reclassify the particular user into a group that better fits the user's preferences as the playlist creation component 115 learns more about the user's individual preferences.

Upon generating or otherwise obtaining the user's 120 general musical preferences model, the playlist creation component 115 can divide the general musical preferences model into the cluster models 155, based on observed listening behavior of the user 120 and user feedback provided by the user 120. The playlist creation component 115 can then create a playlist including musical selections from the library of available musical content, based on the shared preference model. The playlist creation component 115 could generate the playlist to include musical selections that directly match all of the individual preference models for the user 120, as well as related content discovery content that does not directly match the user's 120 selected cluster model.

As an example, the playlist creation component 115 could employ a machine learning algorithm to determine discovery content that is not included in the user's media library but that the user 120 is likely to enjoy, based on the currently selected cluster sub-model, and could include such content in the created playlist. Doing so provides an intelligent way to expose the user 120 to new, undiscovered musical content that is likely to match their musical preferences.

Generally, when creating a playlist, the playlist creation component 115 is configured to select one of the cluster models for the user for use in creating a playlist. The playlist creation component 115 could be configured to employ a variety of different techniques in selecting the cluster model. For instance, the playlist creation component 115 could select one of the cluster models based on a user request. As an example, if a user requests to hear songs from a particular artist, the playlist creation component 115 could select a cluster model that specifies musical characteristics most similar to the requests songs. In such an example, the playlist creation component 115 could then create a playlist using the selected cluster model, while ensuring that the requested songs are included at (or near) the front of the playlist.

As another example, the playlist creation component 115 could monitor the user's 120 behavior over time and could determine circumstances in which the user historically prefers to listen to playlists created using each of the clusters. For example, the playlist creation component 115 could monitor the user's behavior to collect metadata such as the time of day, day of the week, geographic location, etc. for when the user listens to particular clusters of music. The playlist creation component 115 could maintain a machine learning model based on this information and can use such a model to make an intelligent selection of which cluster model to use in creating a playlist for the user. For example, if the playlist creation component 115 determines that the user frequently listens to rock and hip hop music with certain acoustical characteristics while driving in the afternoon, the playlist creation component 115 could select the cluster model that best fits the user's historical preference for use in creating a playlist for the user's subsequent afternoon drives. In such an embodiment, as the user provides feedback for the selected cluster (e.g., requesting a different type of music, skipping past songs having particular acoustical characteristics, providing positive feedback for particular content, etc.) the playlist creation component 115 can refine the cluster model over time to better match the user's listening preferences.

Figure 2:
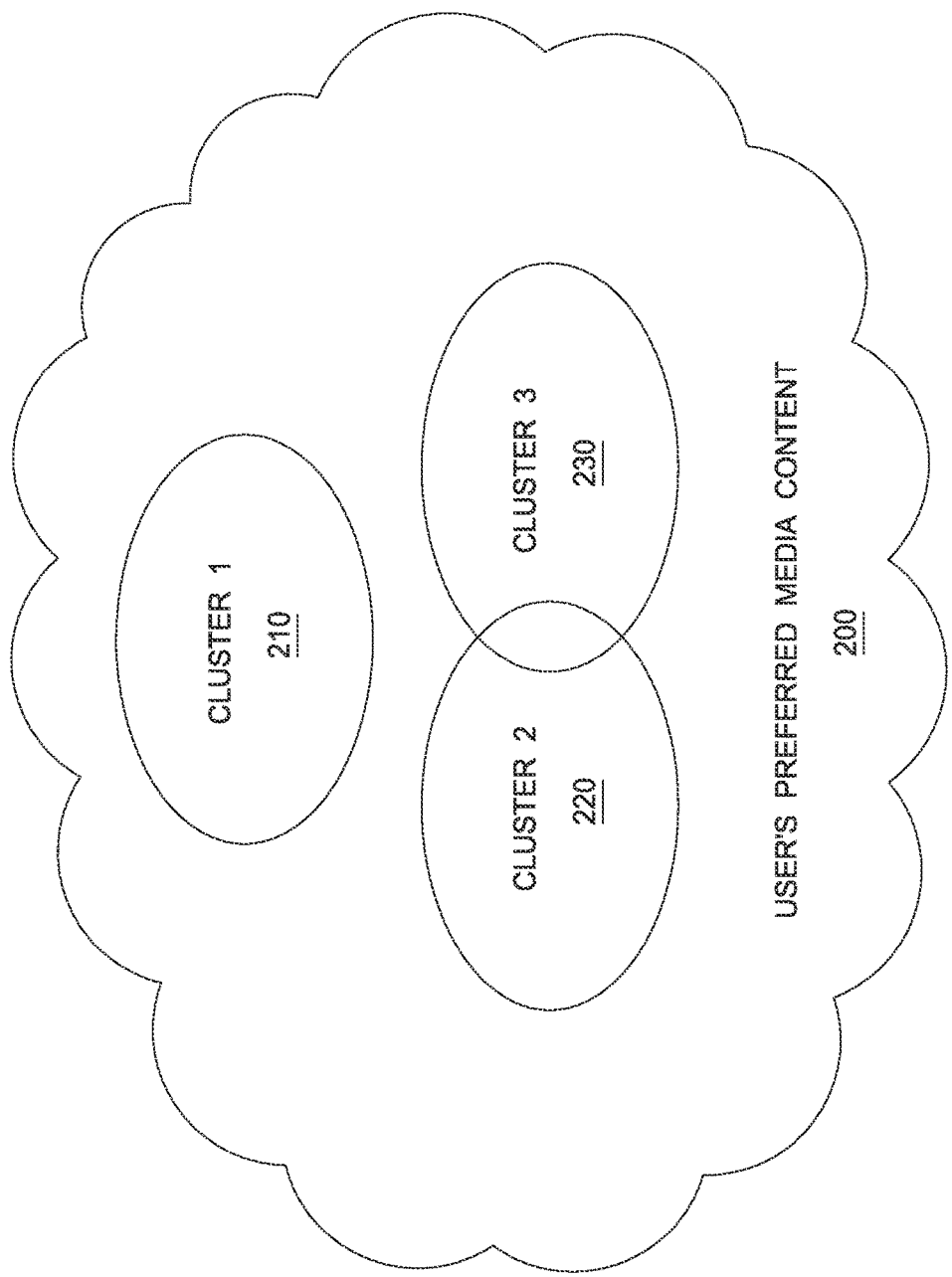
FIG. 2 illustrates a division of a musical preference model into multiple temporal clusters, according to one embodiment described herein.

FIG. 2 illustrates a division of a musical preference model into multiple temporal clusters, according to one embodiment described herein. As shown, the musical preference model 200 includes three clusters 210, 220 and 230. Generally, each of the clusters 210, 220 and 230 represents a set of musical content having acoustical characteristics that match the respective cluster model. In the depicted example, while the cluster 210 does not share any common acoustical characteristics with the clusters 220 and 230, the clusters 220 and 230 share some common acoustical characteristics with each other. For example, the cluster model for the cluster 210 could specify blues music having certain acoustical characteristics (e.g., content from a particular era, content having a tempo in a certain range, content having a certain level of aggressiveness, etc.), while the cluster models for the clusters 220 and 230 could specify rock music having particular musical characteristics. Of course, such a model is provided for illustrative purposes only and without limitation, and more generally, and number and arrangement of cluster sub-models can be created, consistent with the functionality described herein.

Of note, while examples are provided herein that describe an exemplary cluster model as pertaining to a single genre of music, generally the expansiveness of a given cluster is determined based on the corresponding user's personal music listening preferences. For example, a first user may sometimes enjoy listening to playlists that include only jazz music from a certain era, while the same user may at other times enjoy a very eclectic playlist that includes selections from rock, hip hop, rap, pop, and other genres of music. Thus, even in the context of a single user, one cluster model may relate to a very specific set of musical content (e.g., music from a particular sub-genre of jazz from a particular era) while another cluster model may include a wide assortment of musical content (e.g., music from multiple genres and eras).

FIG. 3 illustrates a cluster model describing a temporal window of musical preferences for a user, according to one embodiment described herein. As shown, the cluster model 300 specifies a first set of musical content 310 and a second set of musical content 320. In the depicted example, the first description of musical content 310 specifies the acoustical characteristics of the "Rock" genre, an era within the range of "1988-1999", a tempo within the range of "75-140" beats per minute, and so on. Similarly, the second description of musical content 320 specifies the acoustical characteristics of the genre "Hip Hop", an era of "1981-1995", a tempo within the range of "95-135" beats per minute, and so on. Of note, while the depicted model specifies the characteristics of genre, era, tempo, loudness, aggressiveness, melodicness, spokenness, and vocal-to-instrumental ratio, such characteristics are provided for illustrative purposes only and without limitation. More generally, any characteristics that are in any way descriptive of musical content can be included in a cluster model, consistent with the functionality described herein.

In creating a playlist for the user, the playlist creation component 115 could select the cluster model 300 for use in creating the playlist. For example, the playlist creation component 115 could select the cluster model 300 based on a user request (e.g., a voice command of "Play some rock music", a user selection within a graphical user interface provided by the playlist creation component 115, etc.). As another example, the playlist creation component 115 could automatically select the cluster model 300 based on the current context of the user (e.g., the user's geographic position, whether the user is travelling in such a fashion that indicates the user is driving, a measure of activity for the user as measured using an accelerometer, the time of day, the day of the week, etc.). Additionally, the playlist creation component 115 could determine a library of available musical content (e.g., including both locally available and remotely streamable musical content) and could create the playlist by selecting instances of available musical content that match the acoustical characteristics specified in either of the first description of musical content 310 or the second description of musical content 320.

Once the playlist is created, the playlist creation component 115 can continue monitoring the behavior of the user and feedback provided by the user to refine the cluster model 300. For example, if the user frequently provides negative feedback (e.g., explicitly by selecting a low rating or a thumbs down icon when certain content is playing, skipping the playback of certain content, etc.), the playlist creation component 115 could refine the model to account for the user's preferences. As an example, if the user frequently provides negative feedback for musical content from the "Rock" genre in the era of 1998-1999, the playlist creation component 115 could adjust the description of musical content 310 to span only the eras of "1988-1997" based on the user's feedback. As another example, if the user frequently provides positive feedback for discovery content in the "pop" genre, the playlist creation component 115 could update the cluster model 300 to includes an additional description of musical content that specifies the "pop" genre and ranges of acoustical characteristics matching the pop songs the user has provided positive feedback for. Doing so allows the playlist creation component 115 to continue to refine the cluster model 300 to better match the user's preferences and to account for changes in the user's musical preferences over time.

Figure 4:
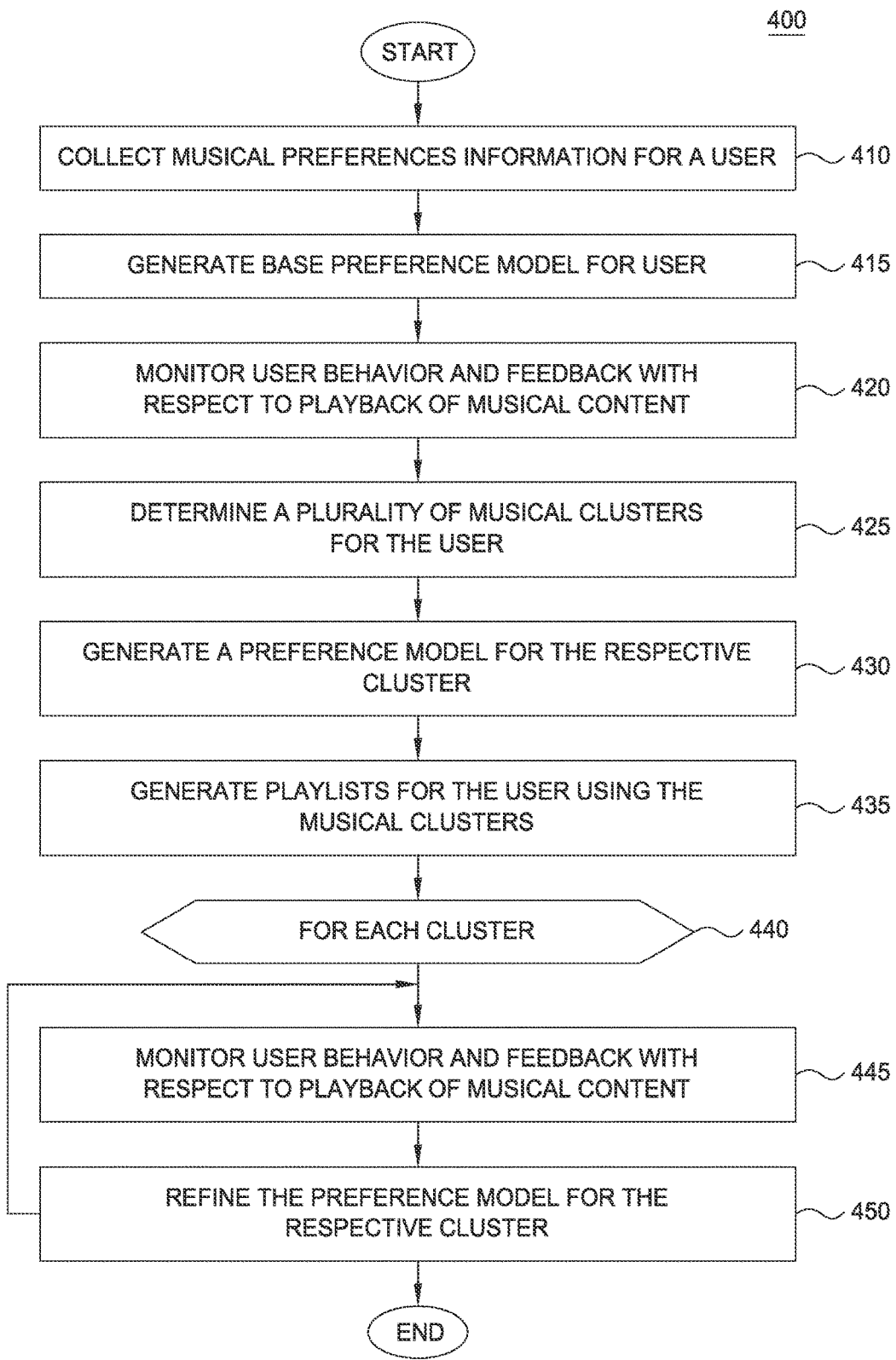
FIG. 4 is a flow diagram illustrating a method of generating and maintaining a musical preference model containing multiple cluster models, according to one embodiment described herein.

FIG. 4 is a flow diagram illustrating a method of generating and maintaining a musical preference model containing multiple cluster models, according to one embodiment described herein. As shown, the method 400 begins at block 410, where the playlist creation component 115 collects musical preferences information for a user. Generally, such musical preferences information can be any data indicative of a user's musical preferences. For example, the musical preferences information could include musical content the user has previously indicated shown an affinity towards. The playlist creation component 115 could retrieve a locally stored media preferences information describing the user's previous behavior relating to a media device on which the playlist creation component 115 is deployed (e.g., within a vehicle). For example, the playlist creation component 115 could maintain such information based on the user's interactions with the vehicle's media player device (e.g., providing an explicit indication of liking or disliking particular musical content, changing the radio station while particular content is playing, listen to certain instances of musical content or types of musical content repeatedly, etc.).

As another example, where a network connection is available (e.g., to the Internet), the playlist creation component 115 could retrieve the user preferences information from a remote server. For example, the playlist creation component 115 could submit a request to such a server over the network specifying identification information for each of the identified user and the server could return a model containing cluster sub-models, each describing a temporal window of acoustical characteristics of musical content preferred by the user. Additionally, the playlist creation component 115 could access APIs for additional services that the users have provided access to. Examples of such additional services include social networking services, content streaming services (e.g., streaming Internet radio stations, streaming video services, etc.). More generally, it is broadly contemplated that the playlist creation component 115 can access any supplemental information which reflects the user's musical preferences.

The playlist creation component 115 then generates a base preference model for the user using the collected musical preferences information (block 415). As discussed above, such a preference model could specify metadata describing acoustical characteristics of musical content preferred by the user. Such metadata could be described using a single value(s) (e.g., the genre of "Rock"), a range of values (e.g., tempo within a certain range of beats per minute) or more generally any form of describing acoustical characteristics of musical content.

The playlist creation component 115 then monitors the user's behavior and feedback with respect to the playback of musical content (block 420). For example, the playlist creation component 115 could monitor for explicit user feedback provided by the user for selections of playing musical content (e.g., feedback indicating the user liked the musical content, did not like the musical content, does not wish to listen to the musical content at the moment, and so on). Additionally, the playlist creation component 115 can monitor for implicit indications of the user's affinity towards particular musical content. For example, the playlist creation component 115 could monitor the user's behavior with respect to radio content and could determine that a user does not like the particular instance of musical content being played at that time (or musical content having attributes similar to the particular instance of musical content) when the user changes the radio station during the playback of the particular instance. As another example, the playlist creation component 115 could determine that an explicit request from the user to play a specific instance of musical content could indicate that the user has at least some affinity towards the specific instance (or musical content having attributes similar to the specific instance of musical content).

In addition to general user feedback for instances of musical content, the playlist creation component 115 monitors selections of content the user enjoys listening to within a temporal window of one another. For example, the playlist creation component 115 could determine that while the user may generally enjoy listening to classical music, the user may not wish for classical selections to be interspersed with rock and roll selections in a created playlist. Continuing the example, the playlist creation component 115 could determine that the user also enjoys certain hip hop content and that the user enjoys hip hop content being interspersed with rock and roll selections in a created playlist.

The playlist creation component 115 then divides the base preference model into a plurality of cluster sub-models, each describing a respective temporal window of musical preferences for the user based on the observed behavior of the user (block 425). For example, the playlist creation component 115 could generate the cluster preference models according to the format shown in FIG. 3 and discussed above. Once the sub-models are created, the playlist creation component 115 uses the generated cluster models to generate playlists for the user (block 435). For example, the playlist creation component 115 could select one of the plurality of cluster models (e.g., based on an explicit user request, based on a predicted user preference, etc.) and could generate the playlist by selecting available instances of musical content that satisfy (or substantially satisfy) the acoustical characteristics specified within the model.

In generating playlists, the playlist creation component 115 can determine a library of available media content that can be selected for inclusion in the playlist. For example, the playlist creation component 115 can identify locally accessible media content that is available for playback. Generally, as used herein, media content is locally available when the media content is stored on a storage media within the physical environment and is remotely available when the media content must be streamed from a remote network (e.g., from a remote server over the Internet). For instance, in an embodiment where the playlist creation component 115 resides within a vehicle, locally accessible media content could be stored on a storage device managed directly by the vehicle's media player device, on a portable device communicatively coupled to the vehicle's media player device (e.g., a portable music device connected via a wired connection, a mobile device connected via a wireless connection, etc.), on a portable storage media (e.g., a CD or DVD-ROM), and so on.

If the playlist creation component 115 determines that a network connection is available for streaming remote content, the playlist creation component 115 can include remotely available content in the library of available media content. Such content can include remote musical selections owned by one of the users within the vehicle (e.g., musical selections contained in cloud storage corresponding to one of the users), musical selections licensed by a streaming music service to which one of the users belongs, publicly available streaming music sources, and so on. Moreover, if the playlist creation component 115 subsequently detects that the network connection has been lost or particular selected instances have otherwise become unavailable, the playlist creation component 115 can remove such instances from the created playlist dynamically.

The method 400 then enters a loop, where for each cluster (block 440), the playlist creation component 115 monitors user behavior and feedback with respect to playback of musical content from playlists corresponding to the respective cluster (block 445) and refines the preference model for the respective cluster based on the user feedback and monitored behavior (block 450), and the method 400 ends. For example, if the playlist creation component 115 detects a pattern of user feedback behavior where the user frequently provides negative feedback (either explicitly or implicitly) for musical content having certain acoustical characteristics, the playlist creation component 115 could refine the preference model for the cluster in question to avoid selecting playlist entries that match the certain acoustical characteristics. As another example, if the playlist creation component 115 determines that a user consistently provides positive feedback for musical content having acoustical characteristics not currently satisfied by the model (e.g., discovery content, content the user explicitly requests during the playlist, etc.), the playlist creation component 115 could refine the model to include these acoustical characteristics so that similar content will be selected for inclusion in playlists for the cluster.

The playlist creation component 115 could further refine the model based on a determination as to how strong of a preference to assign particular acoustical characteristics within the preference models. For example, the playlist creation component 115 could monitor the user's behavior and determine that the user has a very strong preference for the classic rock genre within a particular cluster, while the user has a weaker preference for the blues genre within the same temporal window. As such, the playlist creation component 115 could refine the preference model for the cluster take both preference values into account, such that more selections from the classic rock genre will be selected than from the blues genre in future playlists.

Figure 5:
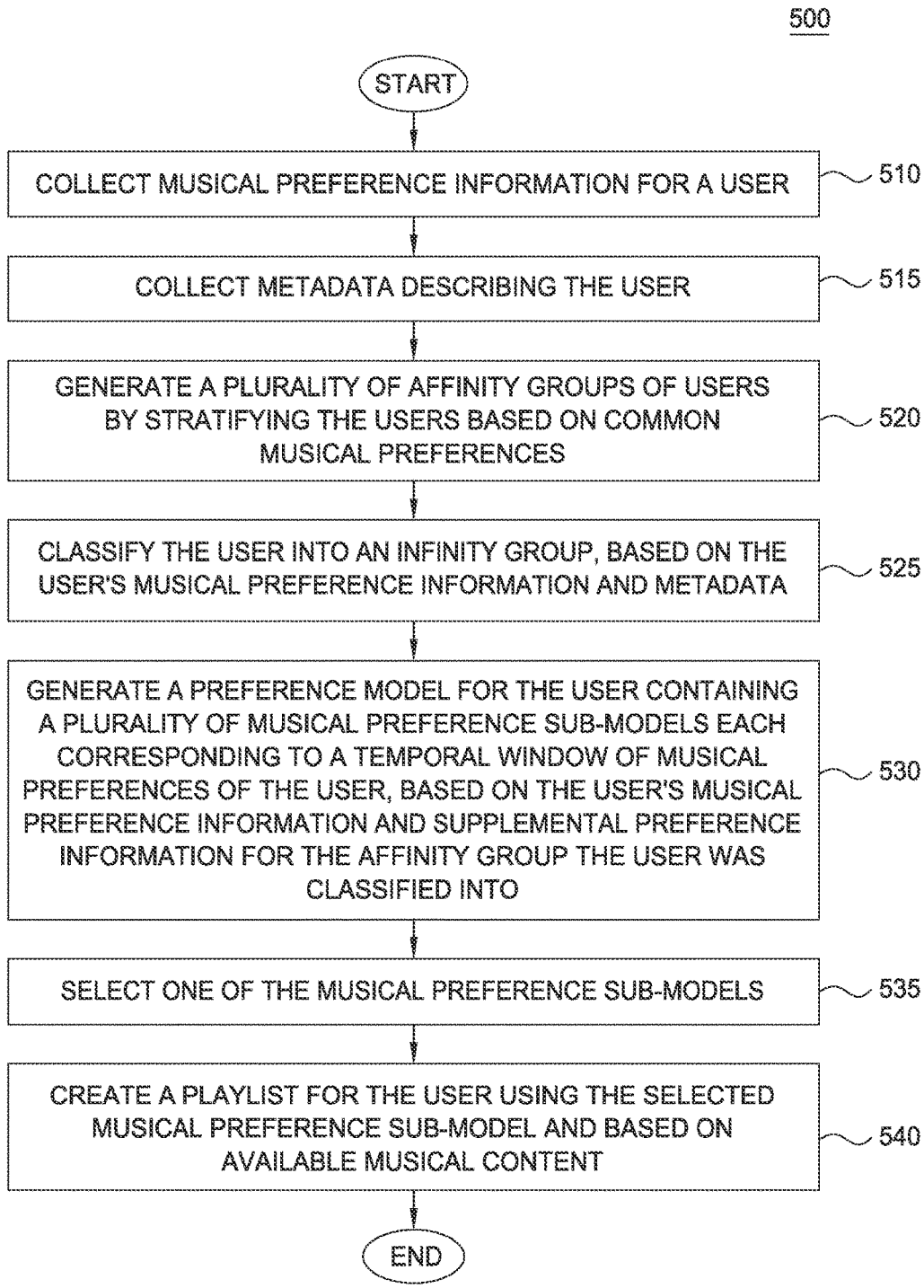
FIG. 5 is a flow diagram illustrating a method of creating a playlist for a user using a musical preference model containing multiple cluster models, according to one embodiment described herein.

FIG. 5 is a flow diagram illustrating a method of creating a playlist for a user using a musical preference model containing multiple cluster models, according to one embodiment described herein. As shown, the method 500 begins at block 510, where the playlist creation component 115 collects musical preference information for a user. For example, the playlist creation component 115 could retrieve metadata describing the user's historical listening preferences. Additionally, the playlist creation component 115 collects metadata describing the user (block 515). Generally, any data that is descriptive of an aspect of the particular user can be used. For example, such data could include the user's age, geographic location, gender, education level and so on.

Additionally, the playlist creation component 115 generates a plurality of affinity groups of users by stratifying users based on common musical preferences and metadata (block 520). Generally, the playlist creation component 115 is configured to group the users based on similar musical preferences and, where indicative of musical preferences, user metadata. Of course, in an embodiment where such groups have been previously created, the playlist creation component 115 can instead retrieve the previously generated affinity group information for use in classifying the user.

The playlist creation component 115 can then classify the user into one of the affinity groups, based on the user's individual musical preferences and metadata (block 525). Generally, the playlist creation component 115 matches the user with the affinity group which most closely matches the user's musical preferences. The playlist creation component 115 then generates a preference model for the user that contains a plurality of musical preference sub-models, each corresponding to a temporal window of musical preferences of the user, using the user's personal musical preference information as well as supplemental musical preference corresponding to the affinity group into which the user was classified (block 530). For example, the playlist creation component 115 could retrieve a base preference model corresponding to the user's affinity group and could refine the base preference model using data describing the user's individual preferences.

At some later point in time, the playlist creation component 115 then selects one of the musical preference sub-models for use in generating a playlist for the user (block 535). The playlist creation component 115 then generates the playlist by selecting available musical content that matches acoustical characteristics specified in the selected musical preference sub-model (block 540), and the method 500 ends. Doing so enables the playlist creation component 115 to intelligently approximate a more complete picture of the user's musical preferences by drawing inferences about the user's musical preferences from those of similar users. Such an embodiment is particularly advantageous, for example, when the playlist creation component 115 does not have significant data describing the user's personal musical preferences or when attempting to discover new content the user has not yet listened to but may enjoy.

Figure 6:
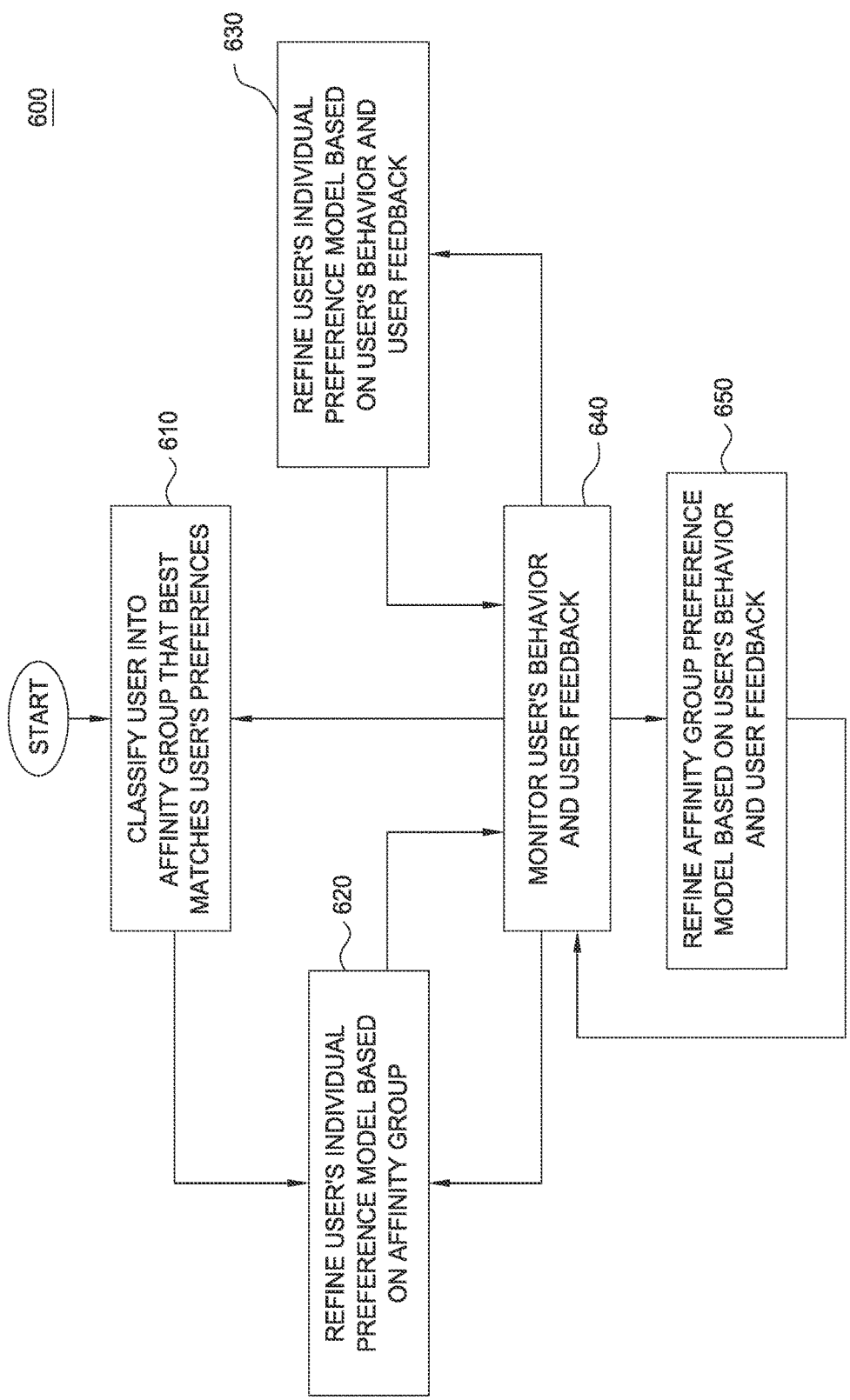
FIG. 6 is a flow diagram illustrating a workflow for maintaining and using affinity groups for use in classifying users, according to one embodiment described herein.

In addition to using preference information from the selected affinity group to build the user's preference model, the playlist creation component 115 can continue to refine the affinity group's preference information based on the user's behavior and feedback. An example of this is depicted in FIG. 6, which is a flow diagram illustrating a workflow for maintaining and using affinity groups for use in classifying users, according to one embodiment described herein. As shown, the method 600 begins where the playlist creation component 115 classifies a user into an affinity group determined to best match the user's musical preferences (block 610). The playlist creation component 115 then uses musical preference information corresponding to the best matching affinity group to generate or refine the preference model for the user (block 620).

Once the user's preference model has been initially generated or refined, the playlist creation component 115 continues to monitor the user's behavior (block 640). The playlist creation component 115 can then use the data characterizing the user's behavior to refine the user's classification as well as the affinity group information. For instance, based on the user's behavior, the playlist creation component 115 can refine the preference model for the selected affinity group (block 650). For example, if the playlist creation component 115 determines that the user's classification into the particular affinity group is still appropriate based on user's personal musical preferences information and listening history, the playlist creation component 115 can incorporate the user's individual preferences information into the preference model for the affinity group to refine the affinity group's preference information. As an example, if the playlist creation component 115 determines that the user has a strong preference for music in the genre of blues but the preference model for the affinity group does not currently include any affinity for blues music, the playlist creation component 115 could determine that other users similar to the user may also enjoy blues music and could update the group preference model information to include at least a potential interest in blues.

Additionally, the playlist creation component 115 can refine the user's individual preference model based on the user's behavior and feedback (block 630). For example, the playlist creation component 115 could include certain discovery selections in playlists created for the user and could analyze the user's behavior and feedback for these discovery selections to discover additional types of musical content the user enjoys. The playlist creation component 115 could then update the user's personal preference model to include these additional types of musical content.

The playlist creation component 115 can also reclassify the user into another affinity group that best matches the user's musical preference, returning to block 610 in the method 600. That is, as the playlist creation component 115 refines the user's individual preferences model over time responsive to the monitored behavior and feedback for the user, the individual preferences model could evolve to a point where the current affinity group selection is no longer the best match for the user. Accordingly, the playlist creation component 115 could reclassify the user into a different affinity group and could use the preference information corresponding to the different affinity group to refine the user's individual preference model. Advantageously, doing so allows the playlist creation component 115 to continue to refine the preference information for both the user and the affinity groups, as well as the user's classification into one of the affinity groups, as the playlist creation component 115 gathers more information about the user's preferences and as the user's preferences evolve over time.

In addition to maintaining cluster information describing temporal windows of musical preferences for a user, the playlist creation component 115 can also maintain voice command models specific to each of the clusters describing the meaning of a particular voice command in the context of the respective cluster. For instance, the playlist creation component 115 could be configured to recognize the voice command of "play something harder" but such a user could intend a different meaning for the phrase depending on the context. As an example, when the user is listening to rock music according to a first cluster model, the user could intend for the playlist creation component 115 to play a selection from the heavy metal genre when the user issues the command "play something harder," but the user could intend for the same voice command to have a different meaning when the user is listening to jazz according to a second cluster model.

Figure 7:
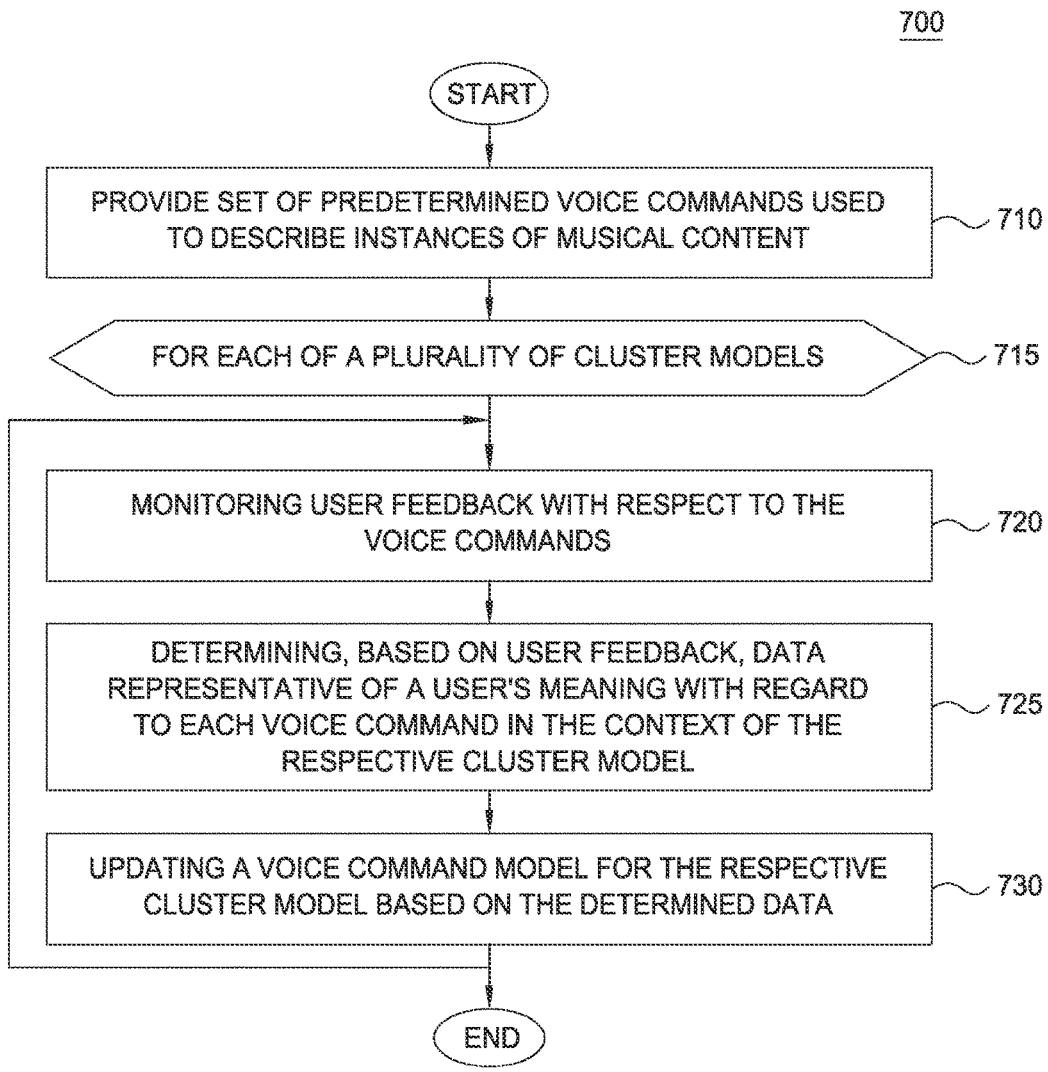
FIG. 7 is a flow diagram illustrating a method for maintaining voice command models for a plurality of clusters of temporal musical preferences, according to one embodiment described herein.

FIG. 7 is a flow diagram illustrating a method for maintaining voice command models for a plurality of clusters of temporal musical preferences, according to one embodiment described herein. As shown, the method 700 begins at block 710, where the playlist creation component 115 provides a set of predetermined voice commands used to describe instances of musical content. Examples of such commands include, without limitation, to play something harder, to play something softer, to play something more upbeat, to play something catchy, to play something acoustic, to play something relaxing, and so on.

The method 700 then enters a loop (block 715), where the playlist creation component 115 monitors user feedback with respect to the voice commands and the playlist creation component's 115 response to each voice commands (block 720). For instance, if the playlist creation component 115 detects the user issued the command to "play something harder," the playlist creation component 115 could select another instance of available musical content using the user's individual preference model (e.g., within the current cluster, within a different cluster, etc.) and could begin playback of the selected instance of musical content. Generally, such a voice command model provides data describing a user's meaning for the command. For certain commands, the user's meaning may be modeled relative to the currently playing track of the playlist. For example, a command such as "play something harder" can be evaluated relative to the currently playing selection of the playlist and in the context of the currently selected cluster.

If the playlist creation component 115 then provides negative feedback for the playlist creation component's 115 behavior (e.g., by providing more specific instruction such as to play a particular artist, issuing the command of "play something harder" again, etc.), the playlist creation component 115 could determine data representative of the user's meaning with regard to the particular voice command in the context of the current cluster model (block 725) and could revise the voice command model for the cluster accordingly (block 730).

For example, the playlist creation component 115 could receive the command of "play something heavy" and could select a different instance of musical content for playback, based on the user's individual preference model and the voice command model for the currently selected cluster. If the playlist creation component 115 then detects a corrective action from the user (e.g., requesting a particular song, artist, genre, etc., instead of the selected different instance of musical content), the playlist creation component 115 could revise the voice command model based on the corrective action. For instance, if the playlist creation component 115 determines that the corrective action specifies to play a particular sub-genre of rock music, the playlist creation component 115 should determine that the particular sub-genre or music that has similar acoustical characteristics as music of the particular sub-genre should be played in the future when the playlist creation component 115 receives the command of "play something heavy" from the user in question and in the context of the currently selected cluster. Doing so provides an improved user experience, as the playlist creation component 115 can more accurately adjust the current playlist based on the user's feedback.

Figure 8:
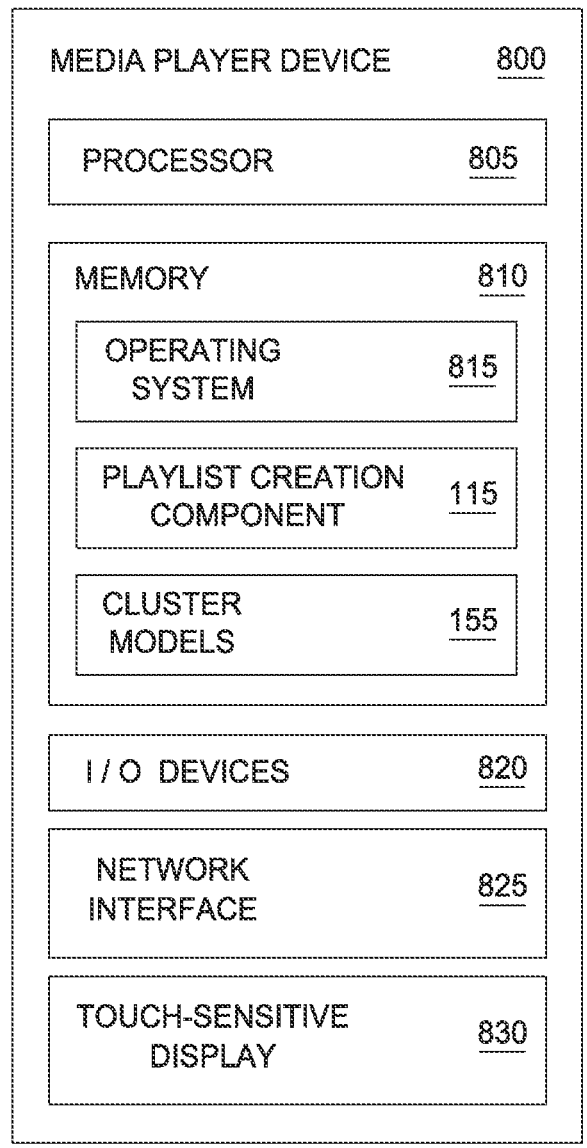
FIG. 8 is a block diagram illustrating a system configured with a playlist creation component, according to one embodiment described herein.

FIG. 8 is a block diagram illustrating a media player device configured with a playlist creation component, according to one embodiment described herein. In this example, the media player device 800 includes, without limitation, a processor 805, memory 810, I/O devices 820, a network interface 825 and a touch-sensitive display device 830. Generally, the processor 805 retrieves and executes programming instructions stored in the memory 810. Processor 805 is included to be representative of a single CPU, multiple CPUs, a single CPU having multiple processing cores, GPUs having multiple execution paths, and the like. The memory 810 is generally included to be representative of a random access memory. The network interface 825 enables the media player device 800 to connect to a data communications network (e.g., wired Ethernet connection or an 802.11 wireless network). The media player device 800 may further include a Bluetooth transceiver module for use in communicating with other devices. Further, while the depicted embodiment illustrates the components of a media device 800, one of ordinary skill in the art will recognize that embodiments may use a variety of different hardware architectures. Moreover, it is explicitly contemplated that embodiments may be implemented using any device or computer system capable of performing the functions described herein.

The memory 810 represents any memory sufficiently large to hold the necessary programs and data structures. Memory 810 could be one or a combination of memory devices, including Random Access Memory, nonvolatile or backup memory (e.g., programmable or Flash memories, read-only memories, etc.). In addition, memory 810 may be considered to include memory physically located elsewhere; for example, on another computer or device communicatively coupled to the media player device 800. Illustratively, the memory 810 includes an operating system 815, a playlist creation component 115 and cluster models 155. The operating system 815 generally controls the execution of application programs on the media player device 800. Examples of operating system 815 include UNIX, a version of the Microsoft Windows® operating system, and distributions of the Linux® operating system. Additional examples of operating system 815 include custom operating systems for gaming consoles, including the custom operating systems for systems such as the Nintendo DS® and Sony PSP®, as well as operating systems configured for mobile devices such as Apple iOS®.

The I/O devices 820 represent a wide variety of input and output devices, including displays, keyboards, touch screens, and so on. For instance, the I/O devices 820 may include a set of buttons, switches or other physical device mechanisms for controlling the media player device 800. For example, the I/O devices 820 could include a set of directional buttons used to control aspects of a video game played using the media player device 800. In the context of the present disclosure, the I/O devices 820 can include at least one audio output device configured to project a steerable beam of sound. Examples of such I/O devices 820 include a beam forming speaker array and an actuated directional speaker. More generally, however, any device capable of projecting a directional beam of sound can be used, consistent with the present disclosure. Additionally, as discussed above, some embodiments may project visual content, in addition to or in lieu of an audio projection. For example, such an embodiment could be configured with a steerable micro projector capable of projecting visual content into the physical environment. More generally, however, any device capable of projecting visual content can be used. Moreover, the I/O devices 820 can include a camera device(s) and microphone(s), for use in detecting user actions and for determining a direction the user is located in, relative to the media player device 800. The touch-sensitive display 830 can be used for outputting a graphical user interface for the media player device 800 (e.g., an interface generated by the operating system 815) and can also be used to detect gestures performed by a user of the media player device 800.

As discussed above, the playlist creation component 115 is generally configured to create user playlists using a selected cluster model describing a temporal window of user preferences. In one embodiment, the playlist creation component 115 determines an initial musical preferences model describing acoustical characteristics of musical content by identifying preferences of a user. Additionally, the playlist creation component 115 can divide the initial musical preferences model into a plurality of cluster models. Each of the plurality of cluster models describes a respective set of acoustical characteristics of musical content for a respective temporal window of preferences of the user. The playlist creation component 115 can select one of the plurality of cluster models and create a playlist for the user by selecting instances of available musical content for playback using the selected cluster model.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments of the invention. However, it should be understood that the present disclosure is not limited to specific described embodiments. Instead, any combination of the aforementioned features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the present disclosure. Thus, the aforementioned aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, the aspects described herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the aspects described herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, the playlist creation component 115 could be deployed on a node within the cloud and could receive requests (e.g., from another instance of the playlist creation component 115 deployed on a media player device) specifying a user to create a playlist for. Generally, any identifying information for the user can be used to specify the user. The playlist creation component 115 could then access centralized user preference data for the user maintained within the cloud computing environment and could generate a preferences model for the user that includes a plurality of cluster sub-models, each describing a temporal window of musical preferences for the user. Such a preference model could then be returned responsive to the request. Doing so allows the user preference information to be queried from any computing device attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A non-transitory computer-readable medium containing instructions that, when executed by a processor, cause the processor to perform an operation comprising:
classifying a user into a first affinity group included in a plurality of affinity groups based on metadata describing musical preferences of the user;
generating, via the processor, an initial musical preferences model for the user based on: (i) the musical preferences of the user and (ii) a second musical preferences model that corresponds to the first affinity group;
dividing, via the processor, the initial musical preferences model into a plurality of cluster models based on the musical preferences of the user, each of the plurality of cluster models representing a different set of acoustical characteristics of musical content;
selecting one of the plurality of cluster models; and
creating, via the processor, a playlist by selecting instances of available musical content for playback using the selected cluster model.

2. The non-transitory computer-readable medium of claim 1, wherein the metadata comprises at least one of user age information, user geolocation information, and musical preference information.

3. The non-transitory computer-readable medium of claim 1, further comprising:
monitoring user behavior and user feedback while the playlist is playing; and
refining an aspect of the selected cluster model, based on the monitored user behavior and user feedback.

4. The non-transitory computer-readable medium of claim 3, further comprising:
refining an aspect of the second musical preferences model corresponding to the affinity group, based on the refined selected cluster model.

5. The non-transitory computer-readable medium of claim 1, wherein determining the initial musical preferences model further comprises:
identifying a plurality of musical selections that the user previously listened to;
determining, for each of the plurality of musical selections, a measure of user feedback for the respective musical selection; and
determining a set of acoustical characteristics describing selections of musical content for which the user provided positive user feedback.

6. The non-transitory computer-readable medium of claim 1, wherein creating the playlist by selecting instances of available musical content for playback using the selected cluster model further comprises:
identifying a library of available musical content; and
creating a playlist of two or more musical selections from the library of available musical content, based on the selected cluster model.

7. The non-transitory computer-readable medium of claim 6, wherein identifying the library of available musical content for the user further comprises:
determining a plurality of musical selections that are accessible for local playback.

8. The non-transitory computer-readable medium of claim 7, wherein identifying the library of available musical content further comprises:
determining a communications network is available for streaming content for playback; and
determining a plurality of streaming music channels available for streaming content using the communications network.

9. The non-transitory computer-readable medium of claim 8, the operation further comprising:
upon determining that the communications network is no longer available, modifying the created playlist to only include musical selections that are accessible for local playback.

10. The non-transitory computer-readable medium of claim 1, the operation further comprising:
providing a plurality of predefined voice commands adapted for use in describing acoustical characteristics of musical content;
generating a respective voice command model for each of the plurality of cluster models;

determining that received audio data corresponds to one of the plurality of predefined voice commands; and selecting one of the instances of available musical content for playback, using the respective voice command model for the selected cluster model.

11. The non-transitory computer-readable medium of claim 10, the operation further comprising:

monitoring at least one of user behavior and user feedback related to a first one of the plurality of predefined voice commands; and refining one of the plurality of voice command models corresponding to the selected cluster model and the first predefined voice command, based on the at least one of user behavior and user feedback.

12. A system, comprising:

a memory storing computer program code; and a processor that is coupled to the memory and, when executing the computer program code, performs an operation comprising:

classifying a user into a first affinity group included in a plurality of affinity groups based on metadata describing musical preferences of the user;

generating an initial musical preferences model for the user based on: (i) the musical preferences of the user and (ii) a second musical preferences model that corresponds to the first affinity group;

dividing the initial musical preferences model into a plurality of cluster models based on the musical preferences of the user, each of the plurality of cluster models representing a different set of acoustical characteristics of musical content;

selecting one of the plurality of cluster models; and creating a playlist by selecting instances of available musical content for playback using the selected cluster model.

13. The system of claim 12, the operation further comprising:

monitoring user behavior and user feedback while the playlist is playing; and refining an aspect of the selected cluster model, based on the monitored user behavior and user feedback.

14. The system of claim 13, the operation further comprising:

refining an aspect of the second musical preferences model corresponding to the affinity group, based on the refined selected cluster model.

15. The system of claim 12, wherein determining the initial musical preferences model further comprises:

identifying a plurality of musical selections that the user previously listened to;

determining, for each of the plurality of musical selections, a measure of user feedback for the respective musical selection; and determining a set of acoustical characteristics describing selections of musical content for which the user provided positive user feedback.

16. The system of claim 12, wherein creating the playlist by selecting instances of available musical content for playback using the selected cluster model further comprises:

identifying a library of available musical content, comprising:

determining a plurality of musical selections that are accessible for local playback;

determining a communications network is available for streaming content for playback; and determining a plurality of streaming music channels available for streaming content using the communications network;

creating a playlist of two or more musical selections from the library of available musical content, based on the selected cluster model; and upon determining that the communications network is no longer available, modifying the created playlist to only include musical selections that are accessible for local playback.

17. The system of claim 12, the operation further comprising:

providing a plurality of predefined voice commands adapted for use in describing acoustical characteristics of musical content;

generating a respective voice command model for each of the plurality of cluster models;

determining that received audio data corresponds to one of the plurality of predefined voice commands;

selecting one of the instances of available musical content for playback, using the respective voice command model for the selected cluster model;

monitoring at least one of user behavior and user feedback for the user related to a first one of the plurality of predefined voice commands; and refining one of the plurality of voice command models corresponding to the selected cluster model and the first predefined voice command, based on the at least one of user behavior and user feedback.

18. A method, comprising:

classifying a user into a first affinity group included in a plurality of affinity groups based on metadata describing musical preferences of the user;

generating, via a processor, an initial musical preferences model for the user based on: (i) the musical preferences of the user and (ii) a second musical preferences model that corresponds to the first affinity group;

dividing, via the processor, the initial musical preferences model into a plurality of cluster models based on the musical preferences of the user, each of the plurality of cluster models representing a different set of acoustical characteristics of musical content;

selecting one of the plurality of cluster models; and creating, via the processor, a playlist by selecting instances of available musical content for playback using the selected cluster model.

* * * * *